United States Patent [19]

Schupp et al.

[11] Patent Number: 4,544,687

[45] Date of Patent: Oct. 1, 1985

[54] HEAT-CURABLE SURFACE-COATING AGENTS, AND THEIR USE

[75] Inventors: Eberhard Schupp, Schwetzingen; Werner Loch, Erpolzheim; Rolf Osterloh, Gruenstadt; Klaas Ahlers, Muenster, all of Fed. Rep. of Germany

[73] Assignee: BASF Aktiengesellschaft, Fed. Rep. of Germany

[21] Appl. No.: 547,093

[22] Filed: Oct. 31, 1983

[30] Foreign Application Priority Data

Mar. 30, 1983 [DE]  Fed. Rep. of Germany ....... 3311513

[51] Int. Cl.$^4$ .............................................. C08L 63/02
[52] U.S. Cl. ................................... 523/414; 204/181.7; 523/415; 524/500; 524/507; 524/539; 524/901; 525/296; 525/379; 525/440; 525/455; 525/481; 525/502; 525/528
[58] Field of Search ................. 523/414, 415; 524/901, 524/500, 507, 539; 525/296, 440, 481, 502, 528, 379, 455; 528/75; 204/181 C

[56] References Cited

U.S. PATENT DOCUMENTS

| | | | |
|---|---|---|---|
| 3,994,989 | 11/1976 | Kempter et al. | 260/831 |
| 4,104,147 | 8/1978 | Marchetti et al. | 204/181 C |
| 4,388,435 | 6/1983 | Loch | 524/548 |

FOREIGN PATENT DOCUMENTS

| | | |
|---|---|---|
| 1303480 | 1/1973 | United Kingdom . |
| 1545390 | 5/1979 | United Kingdom . |

*Primary Examiner*—Theodore E. Pertilla
*Attorney, Agent, or Firm*—Keil & Weinkauf

[57] ABSTRACT

Heat-curable surface-coating agents which, for example in their protonated form, can be used in cathodic electrocoating contain, as a binder, a mixture of (A) a polyadduct, polycondensate or other polymer which has an average molecular weight $\overline{M}_n$ of from 500 to 10,000 and, per molecule, on average two or more OH and/or NH groups and (B) a reaction product of a polyisocyanate and an olefinically unsaturated amine which carries a secondary amino group and a methacrylamide or methacrylate group.

8 Claims, No Drawings

HEAT-CURABLE SURFACE-COATING AGENTS, AND THEIR USE

The invention relates to novel heat-curable surface-coating agents which harden without acid catalysis, in particular those heat-curable surface-coating agents which contain basic groups, so that they are water-dispersible on protonation with acids and can be cathodically electrocoated onto electrically conductive surfaces.

Cathodic electrocoatings, by virtue of their good properties, such as high anticorrosion action and great throwing power, have proved useful for coating metal parts, in particular automotive bodyshells, although they suffer substantial baking losses and generally require baking at above 180° C.

German Published Application DAS No. 2,057,799 describes a process for the cathodic electrophoretic deposition of a water-dispersed ionic organic resin which comprises a positively charged amine-containing resin and a blocked multifunctional isocyanate. In the course of crosslinking, the blocking agent is eliminated and leaves the film, thus causing considerable baking losses.

German Laid-Open application DOS No. 2,752,255 relates to a surface-coating agent which is to be deposited in the cathodic electrocoating process and which contains, inter alia, from 2 to 50% by weight of a diurethane and/or triurethane containing urethane-bonded hydroxyethyl or hydroxypropyl (meth)acrylate. The coatings described in the examples of the said DOS have to be hardened at 180° C.

It is an object of the the present invention to eliminate the disadvantages of existing systems, namely high baking losses and high baking temperature, and, in so doing, to provide films having a particularly high resilience.

We have found that this object is achieved by using a special binder mixture.

Accordingly, the present invention relates to a heat-curable surface-coating agent which contains, as a binder, a mixture of (A) from 50 to 95% by weight of a polyadduct, polycondensate or other polymer which has an average molecular weight $\overline{M}_n$ of from 500 to 10,000 and, per molecule, on average two or more OH and/or NH groups and (B) from 5 to 50% by weight of a reaction product of a polyisocyanate and an olefinically unsaturated amine which carries a secondary amino group and a methacrylamide or methacrylate group.

The present invention also relates to the use of this heat-curable surface-coating agent in water-dilutable protonated form as a cathodic electrocoating binder, and to an aqueous coating bath which contains from 5 to 30% by weight of the novel binder mixture of components (A) and (B) with or without from 0.001 to 5% by weight, based on binder, of heavy metal salts as hardening catalysts.

The surface-coating agents of the invention harden at 140°–180° C., with very low baking losses, into hard, resilient coatings. The addition of hardening catalysts, such as lead, manganese or cobalt salts, even permits hardening to be easily carried out at as low as 130° C.

The components from which the novel surface-coating agent is prepared will now be described in detail:

Component (A) can be a polyadduct, polycondensate or other polymer having an average molecular weight $\overline{M}_n$ of from 500 to 10,000 and selected from a very wide range of compound classes. The sole important point is that the polymeric compound has on average two or more OH and/or NH groups, NH groups being, for the purposes of the present invention, primary and/or secondary amino groups. Component (A) should preferably have a resinous character. Examples of suitable materials are polyesters, alkyd resins, polyethers, polyacrylate resins, polyurethanes, epoxy resins and their reaction products with alcohols, mercaptans or amines. A further suitable class of compounds are polydiene resins or oils, for example polybutadiene oils, into which OH groups can be introduced, for example by adding mercaptoethanol across some of the double bonds. Another way of introducing OH groups into polybutadiene compounds is to react them with maleic anhydride, followed by reacting the product with an OH-containing amine, such as ethanolamine or diethanolamine The required derivatives can also be obtained by epoxidizing polybutadiene oils with per-acids and reacting the product with an amine.

Suitable polyesters have an average molecular weight of from 500 to 10,000 and a hydroxyl number of from 25 to 400 and are prepared from aliphatic and/or aromatic dicarboxylic acids of 4 to 10 carbon atoms, e.g. succinic acid, glutaric acid, adipic acid, pimelic acid, suberic acid, azelaic acid, sebacic acid, cyclohexanedicarboxylic acid, phthalic acid, isophthalic acid or terephthalic acid, or derivatives thereof, and aliphatic diols, such as ethylene glycol, diethylene glycol, triethylene glycol, polyethylene glycol, propanediol, butanediol hexanediol, neopentylglycol or neopentylglycol hydroxypivalate and, if appropriate, more than dihydric alcohols, such as trimethylolpropane, glycerol, erythritol, pentaerythritol, trimethylolbenzene or trishydroxyethyl isocyanurate.

Suitable alkyd resins have a similar structure, except that they contain not more than 25% by weight of one or more monocarboxylic acids, for example fatty acids. It is also possible to use alkyd resins which contain glycidyl esters of branched carboxylic acids.

Examples of suitable polyethers are aliphatic and araliphatic polyethers which are obtained by reacting dihydric and/or polyhydric alcohols with various amounts of ethylene oxide and/or propylene oxide.

Suitable polyacrylates are OH-containing polyacrylates having a hydroxyl number of from 25 to 500. They advantageously have an acid number <25, preferably <10, and a Fikentscher K value (3% strength in acetone) of from 10 to 40, preferably of from 12 to 25, and preferably contain the following monomers:

From 10 to 100% by weight, preferably from 20 to 40% by weight, of one or more hydroxy-($C_2$–$C_4$)-alkyl esters of an $\alpha,\beta$-ethylenically unsaturated carboxylic acid, for example 2-hydroxyethyl and hydroxypropyl (meth)acrylates or butanediol mono(meth)acrylate, from 0 to 90% by weight, preferably from 60 to 80% by weight, of one or more ethylenically unsaturated compounds which are free of carboxyl and hydroxyl, for example vinylaromatics, such as styrene and vinyltoluene, vinyl esters of carboxylic acids of 2 to 18 carbon atoms, such as vinyl acetate and vinyl propionate, vinyl ethers of monoalkanols of 1 to 18 carbon atoms, such as vinyl methyl ether and vinyl isobutyl ether, esters of acrylic acid or methacrylic acid with $C_1$–$C_{12}$-monoalkanols, corresponding diesters of maleic acid, fumaric acid and itaconic acid, (meth)acrylamide, (meth)acrylonitrile, and mixtures thereof.

Examples of suitable polyurethanes are OH-containing polyurethanes which have a hydroxyl number of from 25 to 600 and are prepared from aliphatic and/or aromatic diisocyanates, e.g. from tetramethylene diisocyanate, hexamethylene diisocyanate, isophorone diisocyanate, diphenylmethane diisocyanate, toluylene diisocyanate, naphthylene diisocyanate, diphenyl ether 4,4'-diisocyanate, and any dimers or trimers which can be obtained therefrom, and aliphatic diols, such as ethylene glycol, diethylene glycol, triethylene glycol, polyethylene glycols, propanediol, butanediol, hexanediol, neopentylglycol or neopentylglycol hydroxypivalate and, if appropriate, more than dihydric alcohols, such as trimethylolpropane, glycerol, pentaerythritol, trimethylolbenzene or trishydroxyethyl isocyanurate.

Examples of suitable epoxy resins are glycidyl ethers of the type prepared from 2,2-bis-(4-hydroxyphenyl)-propane and epichlorohydrin. These epoxy resins can have been further modified, for example by having been reacted with polyfunctional alcohols or SH compounds. Examples of polyfunctional alcohols suitable for modifying the epoxy resins are ethylene glycol, propylene 1,2-glycol, propylene 1,3-glycol and butane-1,4-diol.

If it is desired to prepare relatively flexible coatings, the epoxy resins can also be modified with longchain polyfunctional alcohols or mercaptans. If the polyfunctional alcohols or mercaptans are used in more than equivalent amounts, based on the number of epoxy groups present, this gives products having terminal OH or SH groups. If, however, they are used in less than equivalent amounts, this gives products having terminal epoxy groups which may be reacted further. The mercaptans react with epoxy groups even in the absence of a catalyst, while the reaction with the alcohols requires the use of a catalyst, for example dimethylbenzylamine., and elevated temperatures, of from about 50° to 150° C.

Reaction products of epoxy resins with primary or secondary amines, in particular with hydroxyl-containing amines, e.g. ethanolamine, methylethanolamine and diethanolamine, can likewise be used as component (A).

If component (A) is a product which contains sufficient amino groups to water-soluble or water-dispersible on protonation with acids, the product can be combined with component (B) to prepare water-dispersible binders for baking finishes, in particular cathodic electrocoating binders. The above reaction products of epoxy resins with primary or secondary amines can be used for this purpose.

Many of the carrier resins proposed for cathodic electrocoating can also be used as component (A) in the binders according to the invention, namely, for example, the reaction products of phenolic Mannich bases with epoxy resins as described in German Pat. No. 2,419,179, or the reaction products of chain-lengthened epoxy resins with secondary amines as described in U.S. Pat. No. 4,104,147. Other examples of compounds which can be used as component (A) according to the invention are reaction products of one or more aromatic or aliphatic epoxy resins and one or more primary or secondary amines, alkyd resins and polyacrylates, as long as they have an average molecular weight $\overline{M}_n$ of from 500 to 10,000 and, per molecule, on average two or more OH and/or NH groups.

Although the crosslinking activity in the course of baking is completely adequate if component (A) contains only OH and no NH groups, it is frequently advantageous to use products which also contain primary and/or secondary amino groups, since they can be used to prepare aqueous electrocoating baths of high pH, for example from 6.5 to 8.0. A high pH, in particular a pH close to pH 7 or above, helps to prevent corrosion on the electrocoating equipment. One way of preparing products which have primary and secondary amino groups and which are suitable for use as component (A) is to react excess promary diamines with epoxy resins and then separate off the excess amine at elevated temperatures and under reduced pressure.

Diamines suitable for the above reaction are especially those which have from 2 to 6 carbon atoms, for example ethylenediamine, 1,2- and 1,3-diaminopropane, 1,4-diaminobutane and hexamethylenediamine. The reaction products can, if desired, be chain-lengthened with dicarboxylic acids, for example with sebacic acid or with a fatty acid dimer. The desired molecular weight can be set via the ratio of dicarboxylic acid to epoxy resin/ amine adduct, for example by employing 1 mole of fatty acid dimer per 2 molecules of epoxy resin-/amine adduct.

A further way of preparing such products with primary amino groups as are suitable for use as component (A) is to react 1,2 epoxy resins with secondary amines which contain blocked primary amino groups. Examples of such amines are the diketimine of diethylenetriamine, the ketimine of aminoethylethanolamine and the ketimine of N-methylethylenediamine. The ketimines can be prepared in a simple manner from the free amines and a ketone, for example methyl isobutyl ketone, namely by separating water out of the refluxing reaction mixture. In the reaction with epoxy resins only the secondary amino group reacts, and subsequently the ketimine can be cleaved by adding water to re-form the free primary amino group. These products too can be flexibilized by reacting some of the primary amino groups with dicarboxylic acids to lengthen the chain.

Component (A) is present in the binder according to the invention in an amount of from 50 to 95, preferably from 60 to 85, % by weight.

According to the invention, component (B) is a reaction product of a polyisocyanate and an olefinically unsaturated amine which carries a secondary amino group and a methacrylamide or methacrylate group.

Any desired aliphatic, alicyclic and/or aromatic polyisocyanate can be used in preparing component (B). Examples of suitable polyisocyahates are diisocyanates, such as hexamethylene diisocyanate, isophorone diisocyanate, cyclohexane 1,4-diisocyanate, toluylene diisocyanate and diphenylmethane 4,4'-diisocyanate, triisocyanates, such as biuretized or isocyanurated hexamethylene diisocyanate, and the adduct of 3 moles of toluylene diisocyanate with 1 mole of trimethylolpropane. Even isocyanate prepolymers, for example adducts of diisocyanates with polyesterpolyols or polyetherpolyols, can be used as polyisocyanates.

An amine of the formula

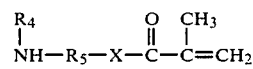

where $R_4$ is a hydrocarbon radical of 3 to 10 carbon atoms which is branched not less than once at the carbon atom adjacent to the NH group, for example isopropyl, tert.-butyl, isoamyl or ethylhexyl, preferably isopropyl or tert.-butyl, $R_5$ is an ethylene or propylene chain and X is oxygen or an NH bridge, is particularly suitable for use as an unsaturated amine which carries a secondary amino group and a methacrylamide or methacrylate group.

An example of a particularly suitable olefinically unsaturated amine is isopropylaminopropylmethacrylamide.

To prepare component (B), either the amine can be added to the polyisocyanate, or the polyisocyanate can be added to the amine. The reaction even proceeds at room temperature, but it can be speeded up by heating the mixture to about 150° C., preferably to about 100° C. If the starting material and the reaction product are liquid at the reaction temperature, it is possible to carry out the reaction in the absence of a solvent, but in general the reaction will be carried out in an inert solvent, such as an ether, ester, ketone or hydrocarbon.

Component (B) is present in the binder according to the invention in an amount of from 5 to 50, preferably from 15 to 40, % by weight.

To prepare the surface-coating agents according to the invention, components (A) and (B) are mixed with each other. If the components are of low viscosity, the mixing can take place in the absence of a solvent, if appropriate by heating the mixture to not more than 130° C. Before relatively viscous products are mixed with each other, they are dissolved in conventional organic solvents, e.g. alcohols, ketones, esters, ethers, hydrocarbons etc.

The surface-coating agents according to the invention, in the presence or absence of pigments, auxiliaries and hardening catalysts, can be applied to such substrates as wood, plastic or metal by a conventional method, such as spraying, dipping, casting and knife-coating. Products which, by virtue of their amino content, become water-dispersible on neutralization with acids, for example acetic acid, can also be applied in the form of an aqueous dispersion. Such heat-curable surface-coating agents according to the invention are preferably used, in their protonated form, as paint binders for the cathodic electrocoating of electrically conductive surfaces, for example of metal components, sheets or the like of brass, copper or aluminum, metalized plastics or materials which have been coated with conductive carbon, and iron and steel which may have been chemically pretreated, for example phosphatized. These electrocoating baths generally contain further additives, such as pigments and auxiliaries.

A cathodic electrocoating bath is generally made up with a solids content of from 5 to 30% by weight by diluting the surface-coating agent with water. The deposition process customarily takes place at 15°–40° C. in the course of from 1 to 5 minutes at pH 4.0–8.5, preferably pH 5.5–8.0, and at deposition voltages of from 50 to 500 volt. The electrically conductive body to be coated is connected as the cathode. The deposited film is hardened above 130° C. in the course of about 20 minutes. If the electrocoating bath does not contain a hardening catalyst, it is advisable to harden at from about 140 to 180° C. The hardening catalyst can be added either to the organic solutiod of the resin, or to the aqueous bath if the hardening catalyst is a water-soluble salt. Suitable hardening catalysts are heavy metal salts, e.g. salts of manganese or cobalt, although lead salts, especially if combined with one of the above metal salts, also have an apcelerating action on the hardening process and thus enable the baking temperature to be lowered. The catalysts are advantageously used in amounts of from 5 to 1,000 ppm of metal, based on aqueous electrocoating bath.

The Examples which follow illustrate the invention without limiting its scope. Parts and percentages are by weight, unless indicated otherwise.

PREPARATION OF COMPONENTS (A) AND (B)

Component $A_1$:

400 parts of hexamethylenediamine are heated to 80° C. An 80% strength solution of 400 parts of a commercially available 1,2 epoxy resin based on 2,2-bis-(4-hydroxyphenyl)-propane and having an epoxide equivalent weight of 500 in toluene is then added. Following an initially exothermic phase, the reaction is completed at 100° C. in the course of 30 minutes. Excess hexamethylenediamine and toluene are then distilled off under reduced pressure at an internal temperature as high as 180° C. The remaining traces of free amine are then drawn off at 0.5 mbar and 180° C. in a thin-film evaporator. The product has an amine number of 169 mg of KOH/g and a softening point of 95° C.

Component $A_2$ 200 parts of component $A_1$, 30 parts of dimerized fatty acid and 20 parts of xylene are gradually heated to 190° C., water being separated off, and are held at this temperature for one hour. When the mixture has cooled down to 130° C., it is diluted, first with 9 parts of butylglycol and then with 70 parts of isobutanol. The product has a solids content of 70%.

Component $A_3$ 500 parts of a commercially available epoxy resin based on 2,2-bis-(4-hydroxyphenyl)-propane and having an epoxide equivalent weight of 500 are dissolved at 100° C. in 100 parts of toluene and 51 parts of butylglycol, the solution is cooled to 80° C., and 105 parts of diethanolamine are added. After the reaction has died down the mixture is heated at 100° C. for a further hour. The product has a solids content of 70%.

Component $B_1$ 566 parts of isopropylaminopropylmethacrylamide, 570 parts of dioxane, 0.3 part of hydroquinone monomethyl ether and 0.3 part of dibutyl-tin dilaurate are heated to 90° C. in a sealed nitrogen-flushed vessel. 573 parts of isocyanurated hexamethylene diisocyanate having an NCO content of 22% and dissolved in 560 parts of dioxane are then added dropwise in the course of 2 hours, and the mixture is held at 90° C. for a further 2 hours, during which the isocyanate content decreases to 0. The product has a solids content of 50%.

Component $B_2$ 86 parts of isopropylaminopropylmethacrylamide, 83.3 parts of dioxane, 0.05 part of hydroquinone monomethyl ether and 0.1 part of dibutyl-tin dilaurate are heated to 70° C. in a sealed nitrogen-flushed vessel. 121 parts of an isocyanate prepolymer prepared from 1 mole of trimethylolpropane and 3 moles of toluylene diisocyanate, having an isocyanate content of 17.3%, and dissolved in 40 parts of ethyl acetate and 83 parts of dioxane are then added dropwise in the course of 1 hour. After a further hour the isocyanate content has decreased to 0. The product has a solids content of 50%.

Component B₃

566 parts of isopropylaminopropylmethacrylamide, 475 parts of dioxane, 0.3 part of hydroquinone monomethyl ether and 0.3 part of dibutyl-tin dilaurate are heated to 100° C. in a sealed vessel. A mixture of 576 parts of biuretized hexamethylene diisocyanate (for example ®Desmodur N from Bayer AG) with an isocyanate content of 21.9%, 81 parts of xylene, 81 parts of ethylene glycol acetate and 475 parts of dioxane are then added dropwise in the course of 2 hours, and the mixture is held at this temperature for 1 hour, during which the isocyanate content decreases to 0. The product has a solids content of 50%.

EXAMPLE 1

Preparation of a Conventionally Applied White Finish 100 parts of component A₁, 120 parts of ethylglycol 60 parts of butylglycol, 80 parts of titanium dioxide and 100 parts of component B₁ are mixed with one another by stirring and heating, and the mixture is then sand-milled to a DIN 53,203 particle size of <10 μm. The grinding medium is then sepaarated off to leave a surface-coating solution which has a solids content of 50% and which is knife-coated onto steel sheet in the form of a 100 μm thick wet film which is then baked at 150° C. in the course of 20 minutes into a very shiny, hard and resilient paint film which is completely resistant to acetone (100 rubs forwards and backwards with an acetone-impregnated cottonwool pad).

EXAMPLE 2

Example 1 is repeated, except that 100 parts of component A₃ are used in place of the 100 parts of component A₁. The properties of the baked paint film are largely identical to those of Example 1.

Examples 3 to 5 concern the use of the heat-curable surface-coating agents according to the invention as electrocoatings deposited at the cathode.

EXAMPLE 3

100 parts of component A₃, 60 parts of component B₁ and 2.2 parts of acetic acid are mixed.

EXAMPLE 4

100 parts of component A₃, 60 parts of component B₂ and 2.2 parts of acetic acid are mixed.

EXAMPLE 5

A binder is prepared by mixing 100 parts of component A₃ with 60 parts of component B₃. The binder is then protonated with 2.2 parts of acetic acid.

Testing the Binder

The acid-protonated binders are diluted with water to 10% strength dispersions to be tested as cationic electrocoatings. 1,000 parts of each binder dispersion is admixed, by stirring, with 66 parts of a pigment paste which has been prepared as follows:

Pigment paste:

A paste binder is prepared as described in Example (1a) of German Laid-Open application DOS No. 3,121,765, namely by heating 200 parts of ethylene glycol monobutyl ether to 90° C. in a reaction vessel, then adding dropwise a mixture of 396 parts of N-vinylpyrrolidone, 204 parts of vinyl propionate and 1.2 parts of azobisisobutyronitrile in the course of 2 hours, and finally polymerizing at 90° C. for 1 hour. The resulting solution polymer has a Fikentscher K value of 24. The solids content of the copolymer solution is 76%.

250 parts of the above copolymer solution, 210 parts of ethylene glycol monobutyl ether, 555 parts of ethylene glycol monoethyl ether, 837 parts of water, 1,084 parts of kaolin, 217 parts of basic lead silicate, 145 parts of carbon black, 36 parts of rutile and 3,000 parts of glass beads having a diameter of 2 mm are stirred at 1,000 r.p.m. for 45 minutes in a stirred ball mill. The glass beads are then separated off to leave a black paste having a solids content of 50.6%.

The baths are then stirred at 30° C. for 48 hours. Paint films are deposited at the voltage shown in the following table in the course of 2 minutes onto zinc-phosphatized steel test panels connected as the cathode, and are baked at 180° C., at 160° C. and at 140° C. for 20 minutes. Thereafter the baked films are tested for resistance to acetone by rubbing them backwards and forwards 50 times with an acetone-impregnated cottonwool pad, and the resilience is examined in the form of the reverse impact test. The following table shows the results.

| | | Results of binder test after aging at 27° C. for 2 days (film thickness: 17 μm) | | | | | | |
|---|---|---|---|---|---|---|---|---|
| | | Ford throwing power with an outside film | Acetone resistance at baking temperature (20 minutes) | | | Reverse impact in × lb | | |
| Binder | pH | thickness of 17μ | 140° C. | 150° C. | 160° C. | 140° C. | 150° C. | 160° C. |
| Example 3 | 8.3 | 20.5 (280 V) | 4 | 2 | 1 | 60 | 160 | 160 |
| | | | 1* | 1* | 1* | 160 | 160 | 160 |
| Example 4 | 8.2 | 19.0 (260 V) | 4 | 2 | 1 | 20 | 80 | 80 |
| | | | 2* | 1* | 1* | 80 | 80 | 80 |
| Example 5 | 8.2 | 21 (300 V) | 4 | 2 | 2 | 100 | 160 | 160 |
| | | | 2* | 2* | 1 | 160 | 160 | 160 |

*Baths contain 50 ppm of manganese in the form of manganese acetate
Acetone resistance: 1 denotes very good; 6 denotes inadequate.

We claim:

1. A heat-curable surface-coating agent which contains, as a binder, a mixture of (A) from 50 to 95% by weight of a polyadduct, polycondensate or other polymer which has an average molecular weight $\overline{M}_n$ of from 500 to 10,000 and, per molecule, on average two or more OH or NH groups or OH and NH groups and (B) from 5 to 50% by weight of a reaction product of a polyisocyanate and an olefinically unsaturated amine which carries a secondary amino group and a methacrylamide or methacrylate group.

2. A surface-coating agent as claimed in claim 1, which contains, as component (A), a reaction product of one or more aromatic or aliphatic 1,2 epoxy resins and one or more primary or secondary amines.

3. A surface-coating agent as claimed in claim 1, which contains, as component (A), an alkyd resin.

4. A surface-coating agent as claimed in claim 1, which contains, as component (A), a reaction product of phenolic Mannich bases an 1,2 epoxy resins.

5. A surface-coating agent as claimed in claim 1, which contains, as component (A), a polyacrylate.

6. A surface-coating agent as claimed in claim 1 or 2 or 3 or 4 or 5, wherein the component (B) used is a reaction product of polyisocyanates and isopropylaminopropyl methacrylamide.

7. A surface-coating agent as claimed in claim 1 or 2 or 3 or 4 or 5, which additionally contains from 0.001 to 5% by weight, based on binder, of heavy metal salts as hardening catalysts.

8. An aqueous cathodic electrocoating bath, which contains from 5 to 30% by weight of a surface-coating agent as claimed in claim 1 or 2 or 3 or 4 or 5.

* * * * *

UNITED STATES PATENT AND TRADEMARK OFFICE
CERTIFICATE OF CORRECTION

PATENT NO. : 4,544,687
DATED : October 1, 1985
INVENTOR(S) : Eberhard SCHUPP et al.

It is certified that error appears in the above—identified patent and that said Letters Patent is hereby corrected as shown below:

Claim 4, column 9, line 4, should read:

--bases and 1,2 epoxy resins--  rather than

"bases an 1,2 epoxy resins".

Signed and Sealed this

Twenty-eighth Day of January 1986

[SEAL]

Attest:

DONALD J. QUIGG

Attesting Officer

Commissioner of Patents and Trademarks